United States Patent [19]

Tucker et al.

[11] 4,005,416
[45] Jan. 25, 1977

[54] APPARATUS FOR PROCESSING RADAR VIDEO SIGNALS

[75] Inventors: Terry Allen Tucker, Charlottesville; Jeffrey Clarus Rice, McLean, both of Va.

[73] Assignee: Sperry Rand Corporation, New York, N.Y.

[22] Filed: June 18, 1975

[21] Appl. No.: 587,940

[52] U.S. Cl. ............................................. 343/5 VQ
[51] Int. Cl.² ........................................ G01S 9/02
[58] Field of Search ..................... 343/5 DP, 5 VQ

[56] References Cited
UNITED STATES PATENTS

| | | | |
|---|---|---|---|
| 3,521,277 | 7/1970 | Evans | 343/5 DP |
| 3,680,095 | 7/1972 | Evans | 343/5 DP X |
| 3,683,380 | 8/1972 | Cantwell, Jr. et al. | 343/5 DP X |
| 3,836,964 | 9/1974 | Evans | 343/5 DP X |
| 3,905,032 | 9/1975 | Truel et al. | 343/5 DP X |
| 3,919,707 | 11/1975 | Evans | 343/5 DP |

*Primary Examiner*—Malcolm F. Hubler
*Attorney, Agent, or Firm*—Howard P. Terry; Seymour Levine

[57] ABSTRACT

A video detector wherein the ratio of the energy contained in a range cell of interest to the average energy contained in adjacent range cells is obtained. When the two ratios are both greater than a predetermined value, a hit is recorded. After a number of transmitted pulses, the hits obtained in the range cell of interest are summed and a target report is given when this sum is equal to or exceeds a specified value.

14 Claims, 4 Drawing Figures

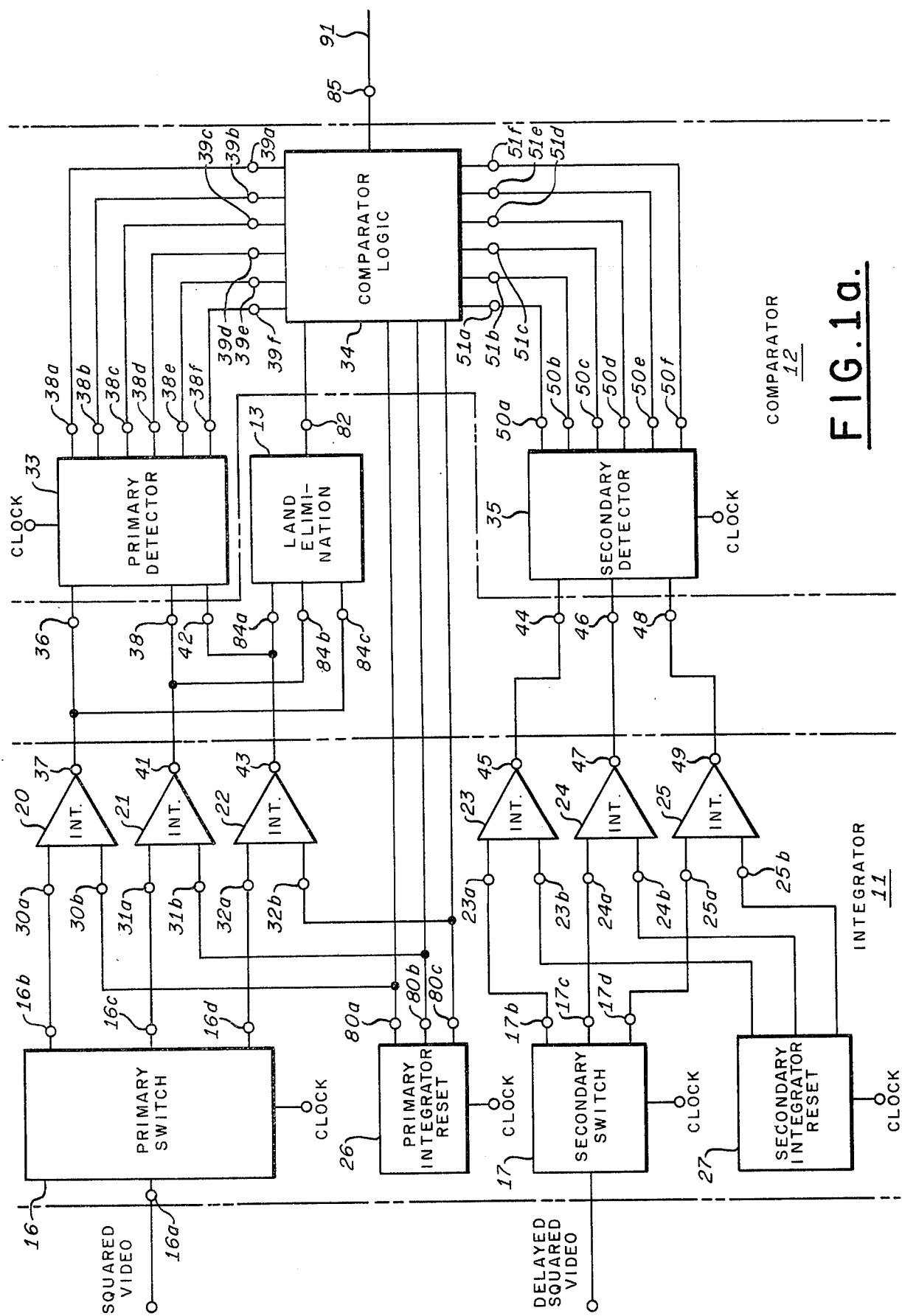

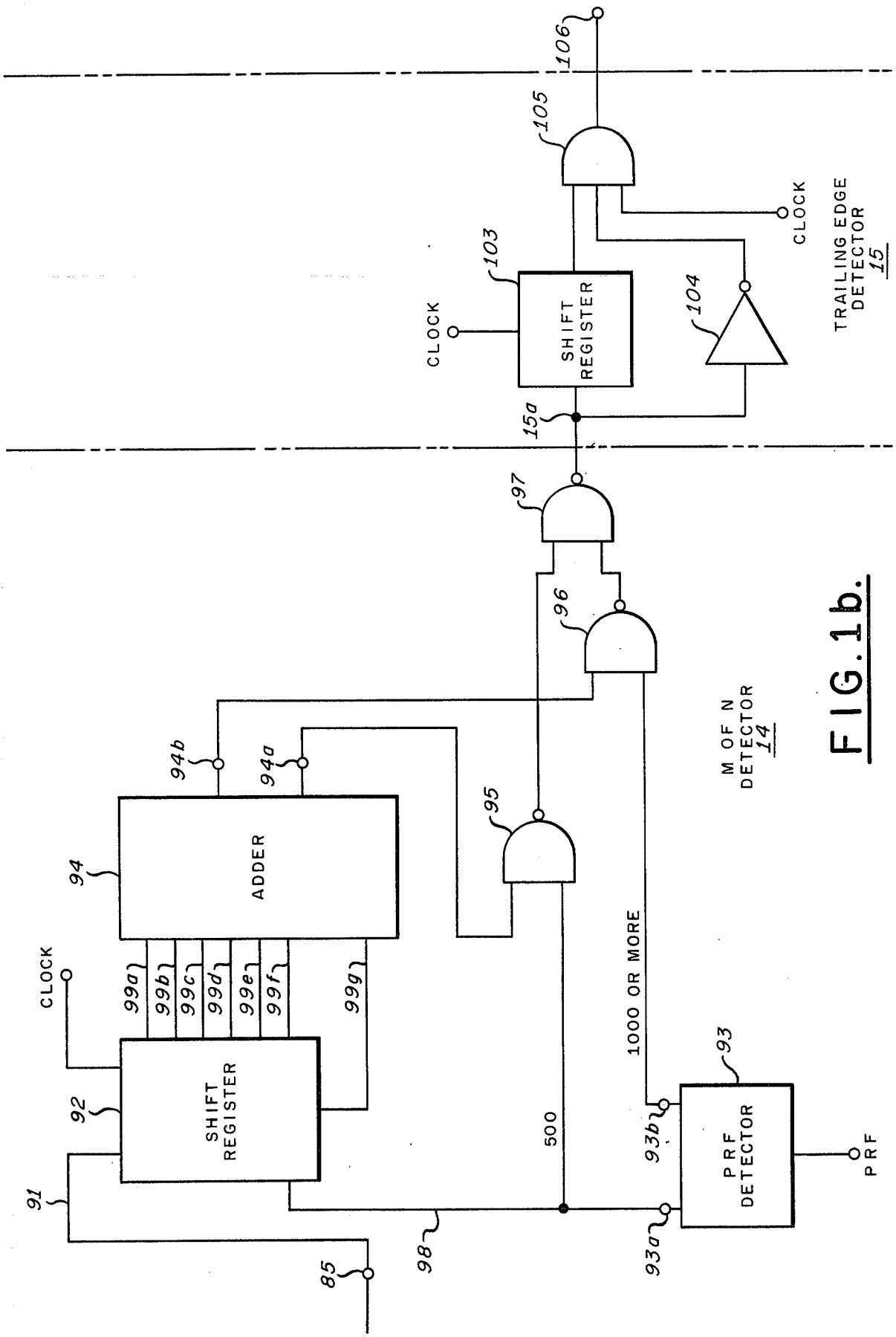

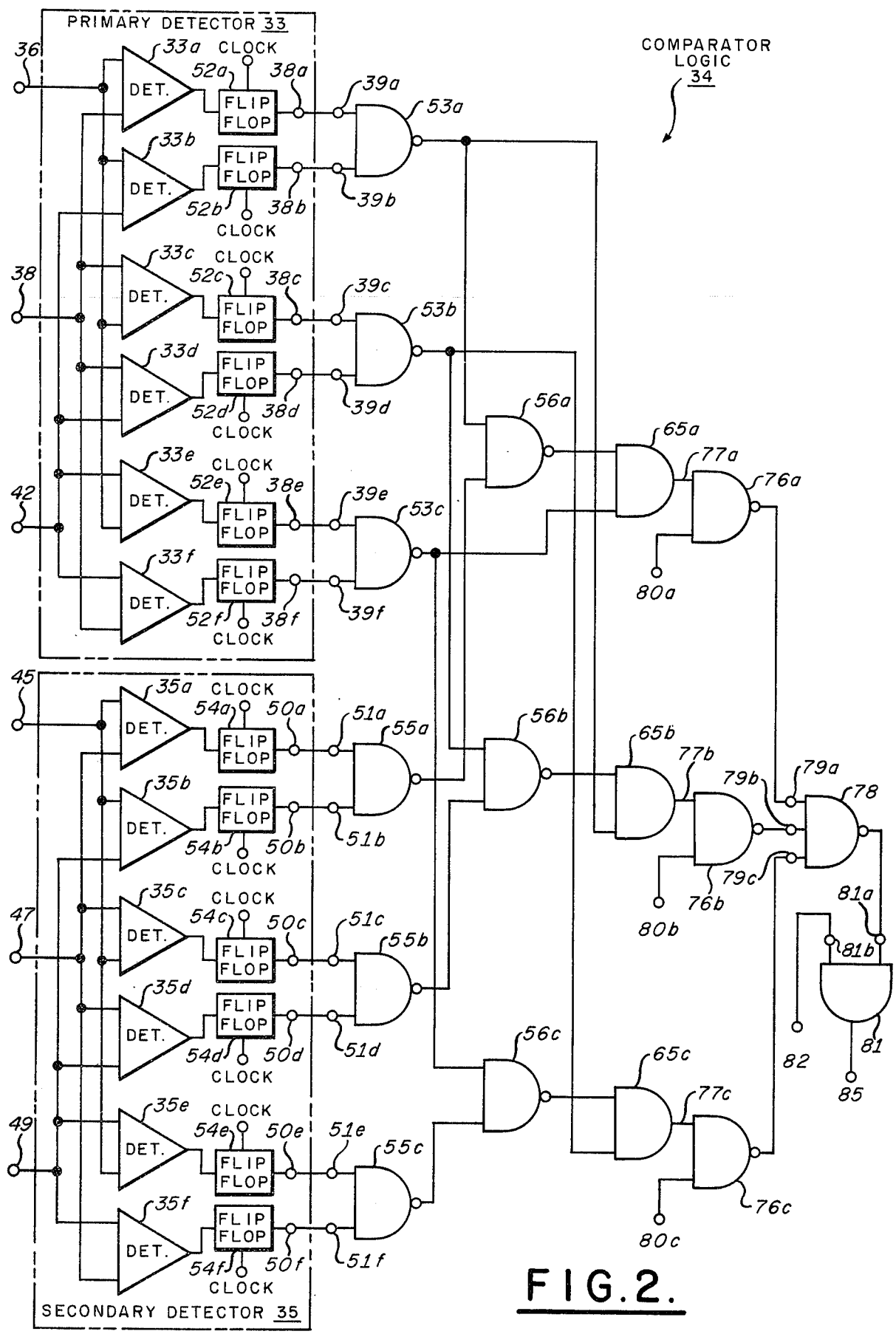

APPARATUS FOR PROCESSING RADAR VIDEO SIGNALS

BACKGROUND OF THE INVENTION

1. Field of the Invention

The subject invention pertains to the art of radar detection and more specifically to radar detection systems wherein the detection threshold is adjusted in accordance to the background noise and interference.

2. Description of the Prior Art

A number of detection techniques for radar, sonar and other detection systems have been proposed in which the detection threshold is automatically adjusted in accordance with variations in background noise and interference. These systems include rank sum, rank quantization and unknown level detection. A rank sum detector passes a video signal through a tapped delay line, whereon the mean signal amplitude, determined over a range cell interval at each tap represents the return signal for a given range cell and on which the presence of a target is sought in the range cell represented by the central tap. The rank of the central tap is determined by comparing the mean signal amplitude at the central tap to the mean signal amplitude at each of the other taps. The rank of the central tap is the number of range cells, in a given group of range cells wherein the mean amplitude is less than the mean amplitude in the range cell represented by the central tap. A target is declared, for the range cell represented by the central tap, when the sum of the ranks obtained after several range sweeps exceeds a specified threshold.

The rank quantization detector like the rank sum detector compares the signal level at the center tap of a tapped delay line to the signal levels at all the other taps. However, instead of obtaining a rank sum after a number of transmitted pulses and comparing the rank sum to a given threshold, the rank quantization detector compares the rank obtained after each transmitted pulse to a specified threshold, sums the number of ranks exceeding the threshold after a number of transmitted pulses and compares the sum to a second threshold to determine the presence of a target.

The unknown level detector also employs a tapped delay line whereon the range cell represented by the central tap is the one of interest. In this detector the square of the mean of the return signal, determined over a range cell interval, at the central tap is compared to the average of the sum of the squares of the mean of the return signals at all the other taps and a hit or a miss is declared, after each transmitted pulse, when the ratio of the square of the mean signal at the center tap to the average of the squares of the mean signals at all the other taps exceeds a specified threshold. As in the rank quantization detector a target report is given when the sum of the hits obtained after a number of transmitted pulses exceeds a given threshold.

Prior art systems provide approximately the same levels of performance and require complex circuitry and an appreciable number of components to achieve a desired probability of target detection. The present invention provides a detection system, which is adjustable to background noise and interference, that realizes a significant reduction in complexity and the number of required components while matching or exceeding the levels of performance achieved by the prior art systems.

SUMMARY OF THE INVENTION

In the preferred form of the radar video processor, disclosed in greater detail below, squared video signals are coupled to an integrator wherein the squared video signal contained within each of three successive range cells are integrated, thereby determining the energy contained therein. The terms, energy level and integrated squared video are used interchangeably hereafter. The energy levels in each range cell are coupled to a comparator wherein the energy contained within the central range cell is compared with the energy contained within the two adjacent range cells. When this comparison reveals ratios of the energy in the central range cell to the energy in each of the two adjacent range cells that are both greater than a specified value, the output signal from the comparator provides a positive indication of an echo signal or a target contained within the central range cell.

To prevent the loss of a target that straddles two range cells, the integrator also integrates squared video that is delayed for a time equal to one-half of a range cell. The integrated delayed squared video is processed by the comparator in the same manner as the integrated undelayed squared video and combined therewith to provide a signal output which is attributed to the central range cell of the undelayed video.

The probability of a target report due to impulse interference of noise is minimized by coupling the output signal from the comparator of a M or N detector wherein the positive indication provided by the output signals of the comparator for a given range cell are summed over a number of range sweeps. When this sum achieves a specified number, a target is indicated. The output of the M of N detector for each range cell is a one or a zero depending upon whether the energy in a given range cell has or has not met both detection criteria. This information is coupled to a trailing edge detector wherein, for data reduction purposes, the existence of a target in a given range cell is not reported until after the M of N detector output, for the given range cell, provides one or more ones followed by a zero.

BRIEF DESCRIPTION OF THE DRAWINGS

FIG. 1 is a block diagram of a radar video detector in accordance with the present invention.

FIG. 2 is a schematic diagram, partially in block form, of a comparator suitable for use in the video detector of FIG. 1.

DESCRIPTION OF THE PREFERRED EMBODIMENT

Figure 3:
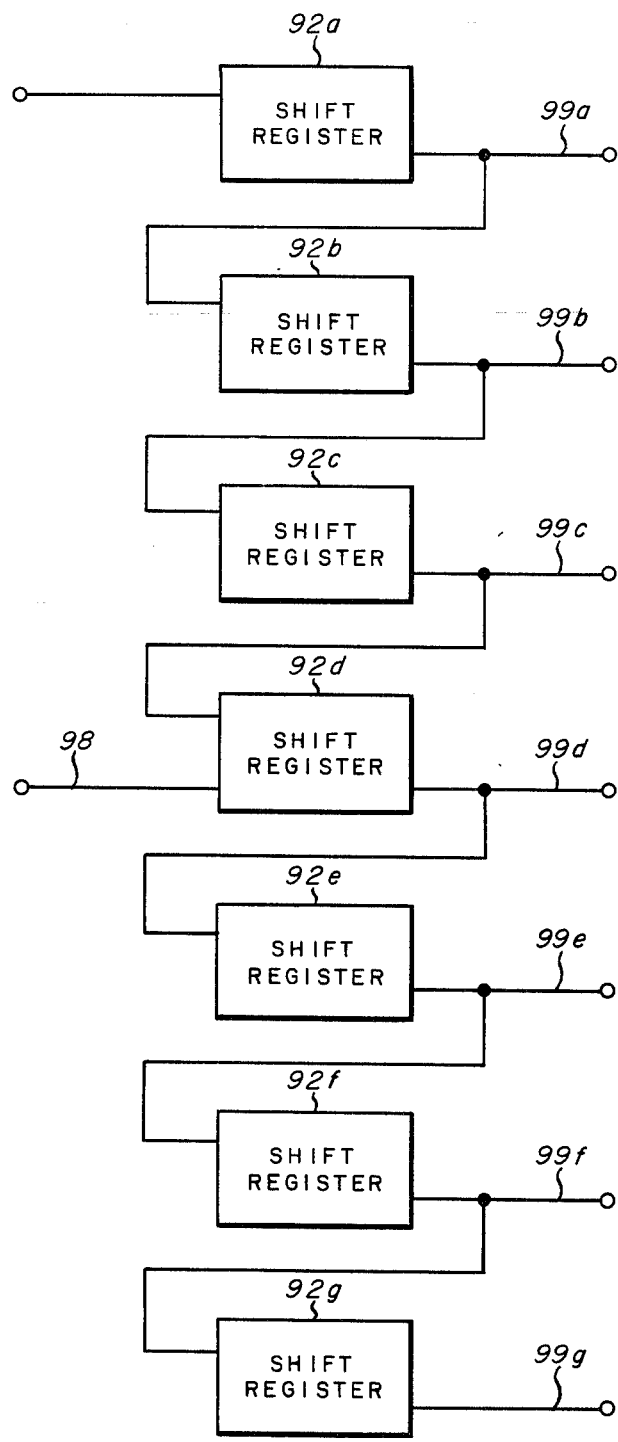
FIG. 3 is a block diagram of a shift register suitable for use in the M of N detector of FIG. 1.

FIG. 1 is a block diagram of the preferred embodiment of the radar video processor 10 which comprises an integrator 11, a comparator 12, a land elimination unit 13, a M of N detector 14, and a trailing edge detector 15. The integrator 11 comprises a primary switch 16, a secondary switch 17, a plurality of operational amplifiers which are designated primary integrators 20, 21, and 22, a plurality of operational amplifiers which are designated secondary integrators 23, 24 and 25, a primary integrator reset unit 26 and a secondary integrator reset unit 27.

The primary switch 16 has one input terminal 16a and three output terminals 16b, 16c and 16d. The input terminal 16a receives squared radar video from a video squaring unit (not shown) which squares the radar detected video in each range cell contained in a range sweep, thus forming sets of sequential squared video signals. Each set corresponding to a range sweep, with the number of elements (squared video signals) contained therein determined by the number of range cells within a range sweep. These sets of signals are cyclically coupled to terminals 30a, 31a and 32a of the primary integrators 20, 21 and 22, respectively, in which the squared video is integrated. While the second and third primary integrators 21 and 22 are holding the integrated values obtained from the integration of the second and third range cells, respectively, primary switch 16 is clocked to couple squared video of the fourth range cell to the first primary integrator 20. During the first half of the interval in which primary integrator 20 integrates the squared video of the fourth range cell, comparator 12 is clocked to compare the integrated squared video of range cells 2 and 3 which are held by the first and second primary integrators 21 and 22.

The comparator 12 comprises: a primary detector 33, a comparator logic unit 34, and a secondary detector 35. The primary detector 33 contains three inputs, a first input terminal 36 is coupled to the output terminal 37 of the first primary integrator 20, a second input terminal 38 is coupled to the output terminal 41 of the second primary integrator 21 and a third input terminal 42 is coupled to the output terminal 43 of the third primary integrator 22; and six output terminals 38a through 38f which are coupled to six input terminals 39a through 39f respectively, of comparator logic unit 34. The secondary detector 35 contains: three input terminals, a first input terminal 44 is coupled to the output terminal 45 of the first secondary integrator 23, a second input terminal 46 is coupled to the output terminal 47 of the second secondary integrator 24, and a third input terminal 48 is coupled to the output terminal 49 of the third secondary integrator 25; and six output terminals 50a through 50f which are coupled to six input terminals 51a through 51f, respectively, of the comparator logic unit 34.

The primary detector 33, the comparator logic unit 34 and the secondary detector 35 may be as shown in the schematic diagram of FIG. 2. The primary detector 33 comprises six ratio detectors 33a through 33f, and six flip-flops 52a through 52f. The output terminal 37 of the first primary integrator 20 is coupled to ratio detectors 33a, 33b, 33c and 33e while the output terminal 41 of the second primary integrator 21 is coupled to ratio detectors 33a, 33c, 33d and 33f and the output terminal 43 of the third primary integrator 22 is coupled to ratio detectors 33b, 33d, 33e and 33f. The output terminals of each of the ratio detectors 33a through 33f are coupled to the input terminals of flip-flops 52a through 52f, respectively, while the output terminals of flip-flops 52a through 52f, which are the primary detector output terminals 38a through 38f, are coupled to the input terminals 39a through 39f, respectively, of the comparator logic unit 34, wherein terminals 39a and 39b are input terminals to NAND gate 53a, terminals 39c and 39d are input terminals to NAND gate 53b and terminals 39e and 39f are input terminals to NAND gate 53c.

The secondary detector 35 comprises six ratio detectors 35a through 35f and six flip-flops 54a through 54f. The output terminal 45 of the first secondary integrator 23 is coupled to ratio detectors 35a, 35b, 35c and 35e, while the output terminal 47 of the second secondary integrator 24 is coupled to ratio detectors 35a, 35c, 35d and 35f, and the output terminal 49 of the third secondary integrator 25 is coupled to ratio detectors 35b, 35d, 35e and 35f. The output terminals of each of the ratio detectors 35a through 35f are coupled to the input terminals of flip-flops 54a through 54f, respectively, while the output terminals of the flip-flops 54a through 54f, which are the secondary detector output terminals 50a through 50f, are coupled to the input terminals 51a through 51f, respectively, of the comparator logic unit 34, wherein terminals 51a and 51b are input terminals to NAND gate 55a, terminals 51c and 51d are input terminals to NAND gate 55b and terminals 51e and 51f are input terminals to NAND gate 55c.

The comparator logic unit 34 further includes NAND gates 56a, 56b and 56c wherein a first input terminal of NAND gate 56a is coupled to the output terminal of NAND gate 53a and a second input terminal to NAND gate 56a is coupled to the output terminal of NAND gate 55a, while a first input terminal to the NAND gate 56b is coupled to the output terminal of NAND gate 53b and a second input terminal to NAND gate 56b is coupled to the output terminal of NAND gate 55b, and the input terminal to NAND gate 56c couples to the output terminals of NAND gates 53c and 55c. The output terminal of NAND gate 56a couples to one input of AND gate 65a, the other input of which, couples to the output terminal of NAND gate 53c. A first input terminal to AND gate 65b is coupled to the output terminal of NAND gate 56b and a second input terminal is coupled to the output terminal of NAND gate 53a, while a first input terminal to AND gate 65c is coupled to the output terminal of NAND gate 56c and a second input terminal is coupled to the output terminal of NAND gate 53b. The output terminals of AND gates 65a, 65b and 65c are coupled respectively to one input of NAND gates 76a, 76b and 76c, and a second input to each of the NAND gates 76a, 76b and 76c are coupled to the output terminals 80a, 80b and 80c respectively of the primary integrator reset unit 26 in FIG. 1. The output of NAND gate 76a is coupled to a first input terminal of NAND gate 78, while the output terminals of NAND gates 76b and 76c are coupled to a second and third input terminal, respectively. The output terminal of NAND gate 78 is coupled to one input terminal of NAND gate 81, the other input of which is coupled to the output terminal 82 of the land elimination unit 13 of FIG. 1.

With the primary integrators 21 and 22 holding the energy levels of the second and third range cells, respectively, primary switch 16 is clocked to couple the squared video of the fourth range cell to the input terminal 30a of the first primary integrator 20, and the d.c. levels held in integrators 21 and 22 are compared in ratio detectors 33d and 33f. When the ratio of the d.c. level held in the second primary integrator 21 to the d.c. level held in the third primary integrator 22 exceeds a specified value, a high level signal is coupled from the ratio detector 33d to the input terminal of flip-flop 52d and a low level signal is coupled from the ratio detector 33f to the input terminal of flip-flop 52f. When the reciprocal of this ratio exceeds the specified value, the high and low level signals are reversed at the inputs of the flip-flops 52d and 52f. Low level signals are coupled to both inputs when neither ratio exceeds the specified value.

During the first half of the interval in which primary integrator 20 integrates the squared video of the fourth range cell, the signal levels at the input terminals of flip-flops 52d and 52f are strobed into the flip-flops 52d and 52f, with the level in flip-flop 52d coupled to the input terminal 39d of the NAND gate 53b and the level in flip-flop 52f coupled to the input terminal 39f of NAND gate 53c. During the second half of the interval in which the first primary integrator 20, FIG. 1, integrates the squared video of range cell 4, the second primary integrator 21 is reset by a signal from the output terminal 80b, of the primary integrator reset unit 26, which is coupled to a terminal 31b of the second primary integrator 21 and the primary switch 16 is clocked to couple the squared video of range cell five to the input terminal 31a of the second primary integrator 21.

At the conclusion of the interval in which primary integrator 20 integrates the squared video in range cell 4, the value then held, is coupled to the ratio detectors 33a, 33b, 33c and 33e and the second primary integrator 21 commences to integrate the squared video of range cell five. The d.c. levels now held in the third primary integrator 22 and in the first primary integrator 20 are compared in ratio detectors 33b and 33e. When the ratio of the d.c. level in the first primary integrator 20, to the d.c. level held in the third primary integrator 22 exceeds the specified value, a high level signal is coupled from the ratio detector 33b to the input terminal of flip-flop 52b and a low level signal is coupled from the ratio detector 33e to the input terminal of flip-flop 52e. If the reciprocal of this ratio exceeds the specified value, the level of the signals coupled to the flip-flops 52b and 52e are reversed.

During the second half of the interval in which the second primary integrator 21 integrates the squared video of range cell five, the signal levels at the input terminals of flip-flops 52b and 52e are strobed into the flip-flops 52b and 52e, with the signal level in flip-flop 52b coupled to the input terminal 39b of NAND gate 53a and the signal level in flip-flop 53e coupled to the input terminal 39e of NAND gate 53c. At this time signals representing the four possible ratios of the energy contained in range cell three to that contained in range cells two and four exist at four of the six input terminals 39b, 39d, 39e and 39f to the NAND gates 53a, 53b and 53c. When the flip-flops 52e and 52f are both at a high signal level state, it indicates that the ratios, of the integrated value obtained by the third primary integrator 22 for the squared video of range cell three to the integrated values obtained by the first primary integrator 20 for the squared video of range cells four and the second primary integrator 21 for the squared video of range cell two, exceed the specified value.

Thus, high level signals are coupled to the input terminals 39e and 39f of NAND gate 53c and low level signals are coupled to the input terminal 39b of NAND gate 53a and to the input terminal 39d of NAND gate 53b, resulting in high level signals at the output terminals of NAND gates 53a and 53b and a low level signal at the output terminal of NAND gate 53c. The high level signal at the output of NAND gate 53a is coupled to one input terminal of NAND gate 56a, the high level signal at the output of NAND gate 53b is coupled to one input terminal of NAND gate 56b and the low level signal at the output of NAND gate 53c is coupled to one input terminal of NAND gate 56c, while the second input terminals of NAND gates 56a, 56b and 56c are coupled to the output terminals of NAND gates 55a, 55b and 55c, respectively. The input terminals 51a through 51f of NAND gates 55a, 55b, and 55c are coupled to the output terminals 50a through 50f of the secondary detector 35, the purpose of which will be explained subsequently.

It is now assumed that low level signals exist at the output terminals of NAND gates 55a, 55b and 55c, which as a consequence thereof, high level signals are established at the output terminals of NAND gates 56a, 56b, and 56c. These high levle signals couple respectively to an input terminal to AND gates 65a, 65b and 65c. The low level signal at the output terminal of NAND gate 53c is coupled to a second input terminal to AND gate 65a, the high level signal at the output terminal of NAND gate 53a is coupled to a second input terminal to the AND gate 65b and the high level signal at the output terminal of NAND gate 53b is coupled to a second input terminal to AND gate 65c.

As a result of the signal levels that exist at the input terminals to AND gates 65a, 65b and 65c, a low level signal exists at the output terminal of AND gate 65a and high level signals exist at the output terminals of AND gates 65b and 65c. These signals are coupled to respective input terminals on NAND gates 76a, 76b and 76c. The second input terminals to NAND gates 76a, 76b and 76c are coupled to terminals 80a, 80b and 80c, respectively, of the primary integrator reset unit 26 in FIG. 1 whereby the reset waveform for the first primary integrator 20 is coupled to NAND gate 76a, the reset waveform for the secondary primary integrator 21 is coupled to NAND gate 76b, and the reset waveform for the third primary integrator is coupled to NAND gate 76c.

During the second half of the time interval in which primary integrator 21 integrates the squared video contained in range cell five, a reset pulse from the terminal 80c of the primary reset unit 26 is coupled to the third primary integrator 22 and is also coupled to the second input terminal of NAND gate 76c. The second input terminal of NAND gate 76a remains at a low level signal until a reset pulse is applied to the first primary integrator 20 and the second input terminal of NAND gate 76b remains at a low signal level until a reset pulse is applied to the second primary integrator 21.

The signal levels at the output terminals of NAND gates 76a, 76b and 76c are coupled to input terminals 79a, 79b and 79c, respectively, of NAND gate 78, the output terminal of which as a consequence of the two high level signals and the one low level signal at the input terminals, provides a high level signal signifying the presence of a target in range cell 3. This high level signal is coupled to input terminal 81a of AND gate 81, the input terminal 81b of which is coupled to the output terminal 82 of the land elimination unit 13 in FIG. 1.

In a marine radar, it is often desirable to blank target indications of large masses. To accomplish this, the land elimination unit 13 is employed. Referring now to FIG. 1, a first input terminal 84c of the land elimination unit 13 is coupled to the output terminal 37 of the first primary integrator 20, a second input terminal 84b is coupled to the output terminal 41 of the second primary integrator 21 and a third input terminal 84a is coupled to the output terminal 43 of the third primary integrator 22. When the signal level at each of the output terminals 37, 41 and 43 exceeds a predetermined reference level, a low level signal appears at the output terminal 82 of the land elimination unit 13. This low level signal is coupled to terminal 81b of AND gate 81 of FIG. 2, causing a low level signal to appear at the output terminal thereof thus blanking any target indication.

When at least one of the signal levels at the output terminals of integrators 20, 21 and 22 does not exceed the reference level, a high level signal appears at the output terminal 82 of the land elimination unit 13 which is coupled to the second input terminals 81b of AND gate 81, permitting the output terminal thereof of exhibit the signal level that corresponds to the signal level at the first input terminal 81a of AND gate 81.

In FIG. 1, the combination of the secondary switch 17, the secondary integrator reset unit 27 and the secondary integrators 23, 24 and 25 in the integrator 11, and the secondary detector 35 in comparator 12 are included to prevent a loss of target detection when a target straddles two range cells. The squared video signal is delayed in time, the delay being equal to one-half the time interval of a range cell, and is coupled to the input terminal 17a of secondary switch 17 which operates in the same manner as the primary switch 16, cyclically coupling the delayed squared video to secondary integrators 23, 24 and 25. Each integrator is cleared prior to the coupling of the squared video of the next delayed range cell to be integrated by that integrator, by signals from secondary integrator reset unit 27 that are coupled to terminals 23b, 24b, and 25b of secondary integrators 23, 24 and 25. The signal levels at the output terminals 45, 47 and 49 of the integrators 23, 24 and 25 are coupled to the input terminals 44, 46 and 48, respectively, to the secondary detector 35 which is identical to the primary detector 33, with the high and low level signals at the output terminals 50a through 50f of the secondary detector 35 coupled to the input terminals 51a through 51f, respectively, of the comparator logic unit 34.

When a target is located half in range cell 2 and half in range cell 3, the primary ratio detector provides low level signals which are coupled to the input terminals 39b, 39d, 39e and 39f of NAND gates 53a, 53b and 53c causing high level signals to be coupled to one terminal of each NAND gate 56a, 56b and 56c and to one terminal of each AND gate 65a, 65b and 65c. Since the target straddles range cells two and three, it appears completely in the delayed range cell three, causing the secondary ratio detector 35 to couple low level signals to the input terminals 51b and 51d of NAND gates 55a and 55b respectively, and high level signals to the input terminals 51e and 51f of NAND gate 55c, which results in the coupling of high level signals to one terminal of NAND gates 56a and 56b and a low level signal to NAND gate 56c. The signals at the output terminals of the NAND gates 56a, 56b and 56c and NAND gates 53a, 53b and 53c, which are coupled to the input terminals of AND gates 65a, 65b and 65c, establish low level signals at the output terminals of AND gates 65a, and 65b and a high level signal at the output of AND gate 65c. Thus, high level signals exist at the output terminals of NAND gates 76a and 76b. A high level signal also exists at the output terminal of NAND gate 76c until the reset signal from terminal 80c of the primary integrator reset unit 26 goes high and resets primary integrator 22. At this time the signal at the output terminal of NAND gate 76c is switched to a low level resulting in a high level signal or target indication at the output terminal of NAND gate 78.

Thus logic unit 34 has performed a correlation of the output signals from the primary and secondary detectors 33 and 35, as a result of which a target has been indicated in primary range cell three when the ratios of the energy in the corresponding range cell of the delayed video signal to the energy in the range cells adjacent thereto, each exceed the specified value.

Referring again to FIG. 1, the output terminal 85 of the comparator logic unit 34 is coupled to the M of N detector 14, which comprises a shift register unit 92, a PRF detector 93, an adder 94, and three NAND gates 95, 96 and 97. Input signals to the M of N detector are coupled via line 91 to the shift register unit 92, which may comprise seven serially coupled shift registers 92a through 92g as shown in FIG. 3. Each of the output terminals of the seven shift registers 92a through 92g is coupled to one of seven input terminals to the adder 94 via lines 99a through 99g. The number of operating shift registers of the shift register unit 92 is made adaptative to the pulse repetition frequency (PRF) of a PRF generator, not shown, by the PRF detector 93 which provides a high or a low level signal to the recirculate control terminal of the shift register 92d via line 98. A high level signal from PRF detector 93, indicating a PRF equal to 500 pulses per second, places the shift register 92d in the recirculate mode preventing the entry of data therein. A low level signal at the output terminal of the PRF detector 93 indicating that the PRF is above 500 cycles per second, places the shift register 92d in the operating mode thus making all seven shift registers available for data storage.

With a radar operating PRF of 500 pulses per second, output data from the comparator logic unit 34, which consists of a series of ones and zeroes representing a target indication or no target indication, are sequentially strobed into the three operating shift registers 92a, 92b and 92c. At the completion of three range sweeps, the target data for each range cell within the range sweep is contained in the three shift registers in reverse order. That it, the data from the first range cell in the first range sweep is contained in the last stage of the shift register 92c, the data from the first range cell of the second range sweep is contained in the last state of the shift register 92b and the data from the first range cell of the third range sweep is contained in the last stage of shift register 92a.

The data in each of the last stages of shift registers 92a, 92b and 92c is sampled in the following manner. When the data from the first range cell of the fourth range sweep is strobed into the first stage of shift register 92a, the data from the first range cell of the third range sweep is strobed out of shift register 92a and coupled to adder 94 via line 99a and to the first stage of shift register 92b. This data in turn strobes out the first range cell of the second range sweep which is also coupled to adder 94 via line 99b and is also strobed into the first stage of the shift register 92c. This data in turn strobes out the first range cell of the first range sweep which is coupled to adder 94 via line 99c. Since shift register 92d is in the recirculate mode, no data can be entered and the sequence terminates. In this manner, the data stored for each range cell, within a range sweep, has been sequentially sampled for target indications by adder 94.

Adder 94 sums the ones (target indications), coupled from the shift register 92 via lines 92a, 92b and 92c, and provides a high level signal at terminal 94a, if this sum is two or more; otherwise, a low level signal will be present at terminal 94a. This signal is coupled to a first input terminal of NAND gate 95, a second input terminal of which is coupled to terminal 93a on PRF detector 93. With two high level signals at the input terminals of NAND gate 95, one representing a PRF of 500 pulses per second, the other signifying that a given range cell has a target indication for at least two of three consecutive range sweeps, a low level signal at the output terminal results. This low level signal is coupled to a first input of NAND gate 97. Terminal 94b, at which a high level signal would appear when all seven shift registers are in the operate mode and the data for a given range cell exhibits a target indication for at least four of seven consecutive range sweeps is at a low signal level due to the cut-off of data entry at shift register 92d. This low level signal is coupled to a first terminal of NAND gate 96, a second terminal of which is coupled to terminal 93b of PRF detector 93 at which a low level signal exists when a PRF of 500 pulses per second is detected and a high level signal exists when a PRF greater than 500 pps is detected. The low level signals at the input terminals of NAND gate 96 result in a high level signal at the output terminal which is coupled to a second input of NAND gate 97. The high and low level signals at the input terminals of NAND gate 97 result in a high level signal at the output terminal. This signal is coupled to the input terminal 15a of the trailing edge detector 15 which comprises, a shift register 103, an inverter 104, and an AND gate 105. An input terminal of the inverter 104 and an input terminal of the shift register 103 are coupled to the input terminal 15a of the trailing edge detector 15. When the data at terminal 15a is strobed into shift register 103,, the previously stored data for this range cell is strobed out of the shift register 103 and coupled to a first input of AND gate 105. The data at terminal 15a is also coupled to the inverter 104, the output of which is coupled to a second input terminal of AND gate 105, to which a strobe clock signal is coupled to a third input terminal. In this manner, the previous range cell data is compared with the present range cell data to determine whether the radar sweep has passed the target. Consider that the previous data has indicated a target, a one or high level signal being strobed out of shift register 103, and that the present data does not indicate a target, that is, the signal level at terminal 15a is a zero or low level signal. The low level signal at terminal 15a is inverted by the inverter 104, thereby coupling a high level signal to the second input of AND gate 105. At this time, a high level signal from the strobe clock also exists at the third input terminal to AND gate 105. Since three high level signals exist, at the three input terminals of AND gate 105, a high level signal exists at the output terminal and a target is reported at an output terminal 106. If the previous range cell data did not indicate a target or the present range cell did indicate a target, a low level signal would exist at the output terminal of AND gate 105 and a target would not be reported.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A radar video processor comprising:
input means for receiving sets of primary sequential signals of a predetermined time duration;
primary integrating means, coupled to said input means, for integrating each of said primary signals over said predetermined time duration, thereby providing an integrated value for each of said primary signals; and
comparator means, coupled to said primary integrating means, for comparing said integrated value of one of said primary sequential signals with said integrated values of primary signals preceding and succeeding said one, and for providing a target indication whenever said comparison of said integrated value of said one to said integrated values of said preceding and succeeding primary signals each exhibit a ratio greater than a predetermined value.

2. A radar video processor in accordance with claim 1 wherein said primary integrating means comprises:
a plurality of primary operational amplifiers for integrating each of said primary sequential signals over said predetermined time duration and holding the value so obtained;
primary switching means for switchably coupling said primary input means to said plurality of primary operational amplifiers, whereby said primary sequential signals are successively coupled to said plurality of primary operational amplifiers; and
primary clearing means providing signals for clearing each of said plurality of primary operational amplifiers in a sequential manner so that each of said primary operational amplifiers is cleared immediately prior to being coupled to said primary input means by said primary switching means, whereby one of said primary operational amplifiers integrates one of said primary sequential signals over said time duration of said primary signal and holds said integrated value for a period determined by said primary switching and primary clearing means.

3. A radar video processor in accordance with claim 2 wherein said signals from said primary clearing means are coupled to said comparator means whereby said comparison data is provided at the receipt of said signal from said clearing means.

4. A radar video processor in accordance with claim 1 wherein said comparison means comprises:
primary detector means, coupled to said primary integrating means, for providing a plurality of output signals which indicate whether said ratio of said integrated value of each of said primary sequential signals to said integrated value of said signals adjacent thereto exceed said predetermined value; and
logic means, coupled to said primary detector means, for determining, from said plurality of output signals, each of said primary sequential signals for which said integrated value exceeds said integrated values for signals adjacent thereto by said predetermined ratio.

5. A radar video processor according to claim 4 further including:
input means for receiving secondary sets of sequential input signals of a predetermined time duration;
secondary integrating means, coupled to said secondary input means, for integrating each of said secondary signals over said predetermined time duration, thereby providing an integrated value for each of said secondary signals; and wherein said comparison means further includes:

secondary detector means, coupled to said secondary integrating means for providing a plurality of output signals representative of the ratios of said integrated value of each of said secondary sequential signals to said integrated values of said signals adjacent thereto;

said plurality of output signals being coupled to said logic means, for correlating said plurality of output signals from said primary and secondary detector to provide an output signal for each of said primary sequential signals indicating whether said ratios of said integrated values for each of said primary signals or its corresponding secondary signal exceed said predetermined value.

6. A radar video processor according to claim 5 wherein said primary integrating means comprises:

a plurality of operational amplifiers for integrating each of said primary sequential signals over said predetermined time duration and holding the value so obtained;

primary switching means for switchably coupling said primary input means to said plurality of primary operational amplifiers whereby said primary sequential signals are successively coupled to said plurality of operational means;

primary clearing means providing signals for clearing each of said plurality of primary operational amplifiers in a sequential manner so that each of said operational amplifiers is cleared immediately prior to being coupled to said primary input means by said primary switching means, whereby one of said primary operational amplifiers integrates one of said primary sequential signals over said time duration of said primary signal and holds said integrated value for a period determined by said switching and clearing means; and wherein said secondary integrating means comprises a plurality of secondary operational amplifiers for integrating each of said secondary sequential signals over said predetermined time duration and holding the value so obtained;

secondary switching means for switchably coupling said secondary input means to said plurality of operational amplifiers, whereby said secondary sequential signals are successively coupled to said plurality of secondary operational amplifiers; secondary clearing providing signals for clearing each of said plurality of secondary operational amplifiers in a sequential manner so that each of said secondary operational amplifiers is cleared immediately prior to being coupled to said secondary input means by said secondary switching means, whereby one of said secondary operational amplifiers integrates one of said secondary sequential signals over said time duration of said secondary signal and holds said integrated value for a period determined by said secondary switching and clearing means.

7. A radar video processor according to claim 5 further including means for coupling said signals from said primary clearing means to said logic means, whereby said comparison data is provided at the receipt of said signal from said primary clearing means.

8. A radar video processor in acccordance with claim 7 further including:

a plurality of storage means, coupled to said comparison means, for storing said data from said comparison means, each of said storage means containing a plurality of storage cells, each storage cell for storing data for one of said integrated value comparisons, said storage accomplished in the same sequential order as said sequential input signals for which said integrated value comparisons are performed; and means coupled to said plurality of storage means, for sampling one of said storage cells in each of a specified number of said storage means, each of said sampled storage cells containing data of said integrated value comparison for input signals in the same relative position of said sequential input signals in each of a number of said sets of sequential input signals, said number of said sets being equal to said specified number of said storage means, to determine if a predetermined quantity of said storage cells contain data specifying that said ratios of said integrated values of said signals in the same relative position of said sequential input signals exceed said predetermined value.

9. A radar video processor in accordance with claim 8 wherein said sampling means contains means for selected said specified number from a plurality of available specified numbers and said predetermined quantity from a plurality of available predetermined quantities.

10. A radar video processor in accordance with claim 8 further including means, coupled to said sampling means, for providing a positive output when said sampling means determines that said specified number of sets of sequential input signals does not provide said predetermined quantity of storage cells that contain data indicating that said number of ratios of integrated values exceed said predetermined value after said sampling means has determined that said predetermined quantity of storage cells contain data indicating that said number of ratios of integrated values exceed said predetermined value for at least the previous specified number of sets of sequential input signals.

11. A radar video processor in accordance with claim 1 further including:

a plurality of storage means, coupled to said comparison means, for storing said data from said comparison means, each of said storage means containing a plurality of storage cells, each storage cell for storing data for one of said integrated value comparisons, said storage accomplished in the same sequential order as said sequential input signals for which said integrated value comparisons are performed; and means, coupled to said plurality of storage means, for sampling one of said storage cells in each of a specified number of said storage means, each of said sampled storage cells containing data of said integrated value comparison for input signals in the same relative position of said sequential input signals in each of a number of said sets of sequential input signals, said number of said sets being equal to said specified number of said storage means, to determine if a predetermined quantity of said storage cells contain data specifying that said ratios of said integrated values of said signals in the same relative position of said sequential input signals exceed said predetermined value.

12. A radar video processor in accordance with claim 11 wherein said sampling means contains means for selecting said specified number from a plurality of available specified numbers and said predetermined quantity from a plurality of available predetermined quantities.

13. A radar video processor in accordance with claim 11 further including means, coupled to said sampling means, for providing a positive output when said sampling means determines that said specified number of sets of sequential input signals does not provide said predetermined quantity of storage cells that contain data indicating that said number of ratios of integrated values exceed said predetermined value after said sampling means has determined that said predetermined quantity of storage cells contain data indicating that said number of ratios of integrated values exceed said predetermined value for at least the previous specified number of sets of sequential input signals.

14. A radar video processor according to claim 1 further including means coupled to said integrating means and said comparison means for inhibiting data from said comparison means when said integrated value for each of said input signals exceeds a predetermined reference value.

* * * * *